United States Patent
Petrik et al.

(10) Patent No.: US 8,673,255 B2
(45) Date of Patent: Mar. 18, 2014

(54) PROCESS AND APPARATUSES FOR PREPARING ULTRAPURE SILICON

(75) Inventors: Adolf Petrik, Freudenstadt (DE); Christian Schmid, Freudenstadt (DE); Jochem Hahn, Rottenburg (DE)

(73) Assignee: Schmid Silicon Technology GmbH (DE)

(*) Notice: Subject to any disclaimer, the term of this patent is extended or adjusted under 35 U.S.C. 154(b) by 68 days.

(21) Appl. No.: 13/131,158

(22) PCT Filed: Nov. 27, 2009

(86) PCT No.: PCT/EP2009/008457
§ 371 (c)(1),
(2), (4) Date: Sep. 19, 2011

(87) PCT Pub. No.: WO2010/060630
PCT Pub. Date: Jun. 3, 2010

(65) Prior Publication Data
US 2012/0003141 A1  Jan. 5, 2012

(30) Foreign Application Priority Data

Nov. 27, 2008 (DE) .................. 10 2008 059 408

(51) Int. Cl.
*C01B 33/02* (2006.01)

(52) U.S. Cl.
USPC .......................................... 423/349

(58) Field of Classification Search
USPC ................................ 423/349, 350
See application file for complete search history.

(56) References Cited

U.S. PATENT DOCUMENTS

| | | | |
|---|---|---|---|
| 4,102,764 A | 7/1978 | Harvey, II et al. | |
| 4,102,767 A | 7/1978 | Mazelsky et al. | |
| 4,102,985 A | 7/1978 | Harvey, II | |
| 4,162,291 A | 7/1979 | Arcella et al. | |
| 4,314,525 A * | 2/1982 | Hsu et al. | 118/716 |
| 4,340,574 A * | 7/1982 | Coleman | 423/347 |
| 4,343,772 A | 8/1982 | Frosch et al. | |
| 4,444,811 A * | 4/1984 | Hsu et al. | 427/213 |
| 4,464,222 A * | 8/1984 | Gutsche | 117/29 |
| 4,676,967 A * | 6/1987 | Breneman | 423/347 |
| 4,734,297 A | 3/1988 | Jacubert et al. | |
| 4,737,348 A * | 4/1988 | Levin | 422/199 |
| 4,820,587 A * | 4/1989 | Gautreaux et al. | 428/403 |
| 4,883,687 A * | 11/1989 | Gautreaux et al. | 427/213 |
| 6,368,568 B1 * | 4/2002 | Lord | 423/350 |
| 6,451,277 B1 * | 9/2002 | Lord | 423/349 |
| 2008/0292525 A1 * | 11/2008 | Eriksen et al. | 423/350 |

FOREIGN PATENT DOCUMENTS

| | | |
|---|---|---|
| CN | 101239723 | 8/2008 |
| DE | 28 14 751 | 10/1978 |
| DE | 28 44 557 | 4/1979 |
| DE | 33 11 650 | 10/1983 |
| EP | 0181803 | 5/1986 |
| EP | 1 337 463 | 8/2003 |
| EP | 1 343 722 | 9/2003 |
| EP | 1 397 620 | 3/2004 |
| JP | 53-85719 | 7/1978 |
| JP | 54-134024 | 10/1979 |
| JP | 2008 264638 | 11/2008 |
| WO | 2006/009456 | 1/2006 |

* cited by examiner

*Primary Examiner* — Anthony J Zimmer
(74) *Attorney, Agent, or Firm* — DLA Piper LLP (US)

(57) ABSTRACT

A process for preparing high-purity silicon by thermal decomposition of a silicon compound includes decomposing the silicon compound by mixing with a carrier gas at a temperature at which the silicon compound is thermally decomposed.

4 Claims, 1 Drawing Sheet

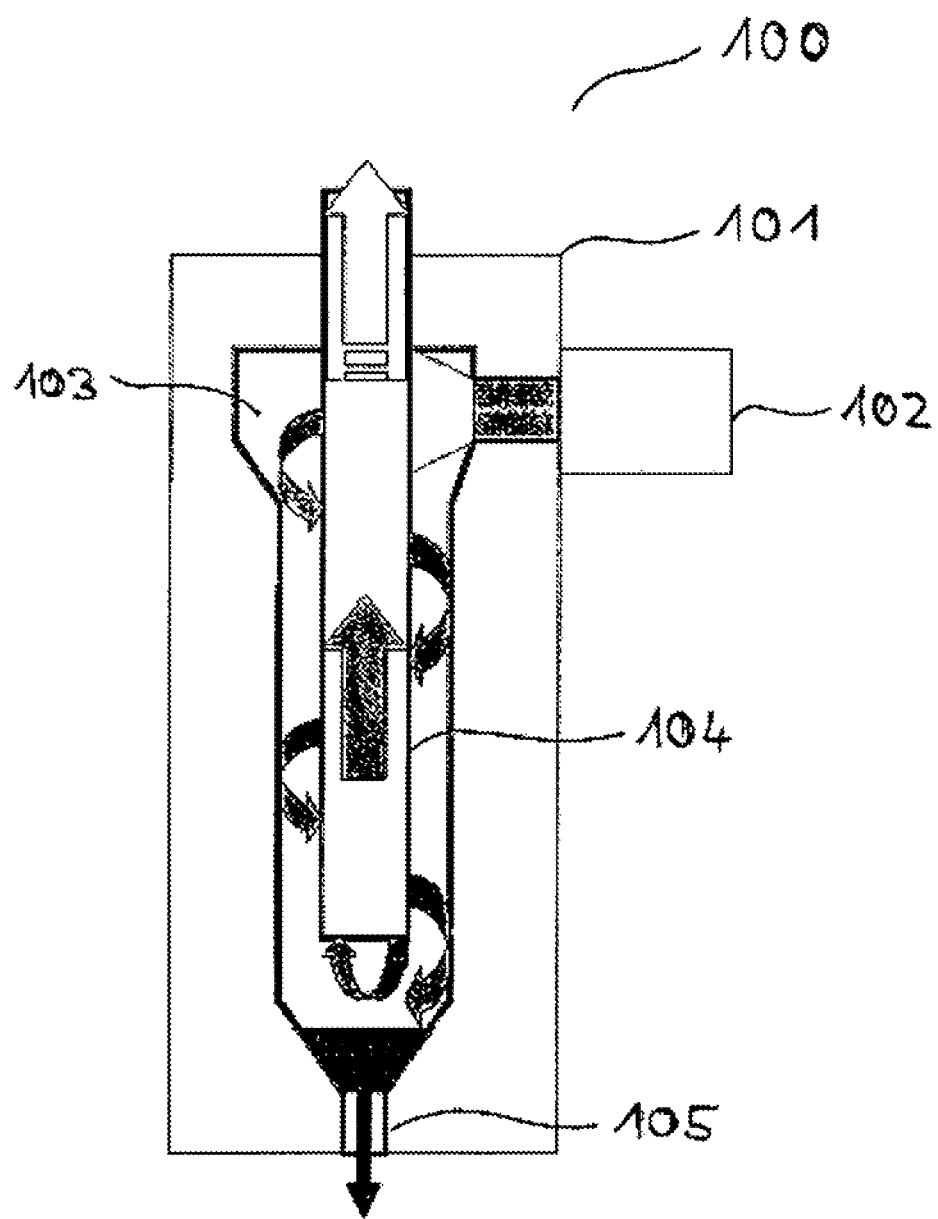

PROCESS AND APPARATUSES FOR PREPARING ULTRAPURE SILICON

RELATED APPLICATIONS

This is a §371 of International Application No. PCT/EP2009/008457, with an international filing date of Nov. 27, 2009, which is based on German Patent Application No. 10 2008 059 408.3, filed Nov. 27, 2008, the subject matter of which is incorporated by reference.

TECHNICAL FIELD

This disclosure relates to a process for preparing high-purity silicon by thermal decomposition of a silicon compound, and to a reactor and a plant in which such a process can be performed.

BACKGROUND

High-purity silicon is generally prepared in a multistage process proceeding from metallurgical silicon. In many known processes, for this purpose, metallurgical silicon is first converted to a silicon-hydrogen compound which can then be decomposed thermally to silicon and hydrogen. A corresponding reaction sequence is described, for example, in DE 33 11 650.

Silicon compounds are typically decomposed thermally either over particles heated to a high temperature in a fluidized bed or filaments heated to a high temperature in a decomposition or pyrolysis reactor. The latter procedure is described, for example, in EP 0181803. Detailed descriptions of suitable fluidized bed reactors can be found, for example, in EP 1 397 620, EP 1 337 463 or EP 1 343 722.

Both thermal decomposition of silicon compounds in a fluidized bed and decomposition over filaments heated to a high temperature have a crucial disadvantage, namely that it is necessary to "harvest" the precipitated silicon at regulator intervals. The reactors in which the decomposition is effected have to be shut down for this purpose so that it is possible to remove the filaments or the particles on which the silicon has been deposited and to replace them. This is associated with a high level of inconvenience and cost. First, the replacement filaments required or the replacement particles first themselves have to be produced in a complex process. Second, considerable time and energy losses are associated with the regular stoppage and restart of the pyrolysis reactors. Furthermore, the reactors have to be purged thoroughly when being restarted.

It could therefore be helpful to provide a technical solution for preparation of ultrapure silicon, in which the above problems do not occur. More particularly, it could be helpful to enable very substantially continuous operation of a pyrolysis reactor without the regular interruptions mentioned.

SUMMARY

We provide a process for preparing high-purity silicon by thermal decomposition of a silicon compound including decomposing the silicon compound by mixing with a carrier gas at a temperature at which the silicon compound is thermally decomposed.

We also provide a reactor for preparing high-purity silicon by thermal decomposition of a silicon compound including a heat-resistant interior into which a mixture of a silicon compound with a carrier gas heated to temperatures of >1410° C. is introduced, an outlet for gaseous decomposition products and an outlet for liquid silicon.

BRIEF DESCRIPTION OF THE DRAWING

FIG. 1 shows the schematic diagram of a preferred example of our plant for preparing ultrapure silicon.

DETAILED DESCRIPTION

In our process for preparing high-purity silicon, as in known processes cited at the outset, thermal decomposition of a preferably gaseous silicon compound is effected.

Compared to the processes already known, our process, however, is notable especially in that the silicon compound is decomposed by mixing it with a carrier gas which is at a temperature above the decomposition temperature of the silicon compound. In contrast to the known processes, thermal decomposition of the silicon compound is thus not effected over the surface of a heated solid object, for example, over a red-hot filament. Instead, it is effected in the gaseous phase in particular.

A preferred feature of the process is that the energy required for decomposition of the silicon compound is at least partly, preferably provided via the carrier gas.

Preferably, the silicon compound is thermally decomposed under conditions under which the silicon obtained from the decomposition is obtained in liquid form.

For example, this can be done by decomposing the silicon compound at a temperature above the melting point of silicon (especially at a temperature of ≥1410° C.), more preferably at a temperature between the melting temperature of silicon and the boiling temperature of silicon.

At such a high temperature, the silicon which results from the decomposition is generally not obtained in solid form. Instead, it can be obtained directly in liquid form. The melt of high-purity silicon thus formed can be removed continuously without any problem, which permits regular stopping and restarting of the reactor, mentioned at the outset, for "harvesting" silicon precipitated in solid form to be avoided.

In the known processes, there has in principle always been an attempt to perform thermal decomposition of silicon compounds over filaments or fluidized bed particles at minimum temperatures to minimize the energy expenditure required. The high temperatures in our process, in contrast, at first require a higher energy expenditure. This additional expenditure is, however, at least partly compensated for by the fact that the process can be operated continuously. Regular stoppage and reheating of the pyrolysis reactor owing to the need to exchange filaments or fluidized bed particles are dispensed with. In combination with the lack of the necessity to provide specific filaments and particles for precipitation, our process offers considerable advantages over the known processes.

It should be pointed out explicitly that the feature of the thermal decomposition of the silicon compound under conditions under which the silicon which is obtained from the decomposition is obtained in liquid form can in principle also be achieved independently, i.e., without mixing the silicon compound to be decomposed with a heated carrier gas. High-purity silicon can, for example, also be obtained in liquid form when a silicon compound decomposes on a solid surface heated to a correspondingly high temperature, or as a result of electromagnetic radiation, especially thermal radiation. The preferred decomposition temperatures above the melting point of silicon can be established not only using a heated carrier gas.

More particularly, it is also possible to pass the silicon compound through a hollow body (for example a tube) heated to a temperature above the decomposition point of the silicon compound, preferably above the melting point of silicon, especially to a temperature between the melting temperature of silicon and the boiling temperature of silicon, without mixing it with the heated carrier gas mentioned beforehand. On contact with the heated walls of the hollow body and/or as a result of thermal radiation emanating from the heated walls of the hollow body, the silicon compound can be decomposed. The silicon formed can then be condensed, preferably in the reactor which is described below.

We thus also provide a process for preparing high-purity silicon by thermal decomposition of a preferably gaseous silicon compound characterized in that thermal decomposition of the silicon compound is undertaken such that silicon obtained from the decomposition is obtained in liquid form (irrespective of the method by which the decomposition is effected).

When a heated carrier gas is used, the thermal decomposition can be accomplished particularly advantageously by the carrier gas, before being mixed with the silicon compound, being heated to a temperature above the melting point of silicon (especially to a temperature of $\geq 1410°$ C.), more preferably to a temperature between the melting temperature of silicon and the boiling temperature of silicon.

Before the silicon compound is added, the carrier gas is preferably heated to a temperature between 1410° C. and 5000° C., preferably between 1650° C. and 5000° C., more preferably to a temperature between 2000° C. and 4000° C., especially to a temperature between 2000° C. and 3000° C.

The silicon compound is preferably a silicon-hydrogen compound, more preferably monosilane ($SiH_4$). However, for example, it is also possible to perform decomposition of chlorosilanes, for example especially trichlorosilane ($SiHCl_3$), by our process. The use of room temperature liquid silanes is also conceivable in principle. They may have to be evaporated before mixing with the carrier gas.

High-purity silicon shall mean, incidentally, especially silicon which can be processed further directly in the semiconductor industry, for example for production of solar cells or microchips.

The carrier gas is, incidentally, preferably hydrogen. This is of course the case especially when the silicon compound is a silicon-hydrogen compound. Further preferably, the carrier gas may also be a carrier gas mixture of hydrogen and a noble gas, especially argon. The noble gas is present in the carrier gas mixture preferably in a proportion between 1% and 50%.

An appropriate amount of energy can be introduced into the carrier gas especially by a plasma generator. The silicon compound is thus preferably mixed with a plasma as the carrier gas, more preferably with a hydrogen plasma.

As is well known, a plasma is a partly ionized gas which contains, in a significant proportion, free charge carriers such as ions or electrons. A plasma is always obtained by external energy supply which can be effected especially by thermal excitation by radiative excitation or by excitation by electrostatic or electromagnetic fields. The latter excitation method in particular is preferred. Corresponding plasma generators are commercially available and need not be further explained.

In general, the temperature of the mixture of carrier gas and silicon compound does not exceed the boiling temperature of silicon (3280° C.). A range between 1410° C. and 3280° C. is correspondingly preferred. Within this range, especially temperatures between 1410° C. and 2000° C. are preferred. Particular preference is given to mixing the silicon compound to be decomposed with the heated carrier gas such that the resulting mixture has a temperature between 1600° C. and 1800° C. What is crucial for this purpose is especially the temperature of the carrier gas, and additionally the mixing ratio between the carrier gas and the silicon compound.

Preferred ranges for the carrier gas temperature have already been specified. The proportion of the silicon compound in the mixture is more preferably between 5% by weight and 99% by weight, especially between 5% by weight and 50% by weight, more preferably between 5% by weight and 20% by weight.

The mixture of the silicon compound with the carrier gas is preferably passed into a reactor, especially immediately after the mixing. In this case, the thermal decomposition of the silicon compound does not proceed only once within the reactor. Instead, it generally already sets in beforehand. When a heated carrier gas is used, decomposition, for example, generally sets in as early as in the course of the mixing operation. In the reactor, decomposition can be concluded and, more particularly, the mixture can also at least partly separate there. After commencement of decomposition, the mixture of course no longer comprises only the silicon compound and the carrier gas, but also silicon vapors and possibly gaseous decomposition products. Silicon vapors can condense on the reactor walls. Condensed silicon vapors can in turn collect at the reactor bottom. The liquid silicon which collects at the reactor base is preferably discharged from the reactor in a batch process or continuously or at least quasi-continuously. The liquid silicon can subsequently be divided into portions and converted to a form suitable for further processing, for example by casting.

The mixture is introduced into the reactor at preferably relatively high flow rates to achieve good turbulence within the reactor. The aspect of turbulence will be discussed in more detail below. Particular preference is given to velocities in the range between 200 m/s and 800 m/s, more particular between 200 m/s and 400 m/s. Strictly speaking, the term "introduction" is no longer appropriate for these velocities. At these velocities, it is better to refer to "injection" under high pressure. The mixture is preferably introduced continuously or at least quasi-continuously into the reactor.

As an alternative, it is possible to form the mixture in the reactor. In this case, the silicon compound and the heated carrier gas are separately introduced into the reactor and mixed at the moment or after introduction into the interior of the reactor so that the decomposition starts in the reactor.

In each case, it is preferred that the silicon vapor obtained from the decomposition is condensed in the reactor and discharged from the reactor in liquid form. We thus also provide a process for preparing high-purity silicon by thermal decomposition of a silicon compound characterized in that the silicon compound is mixed for decomposition with a carrier gas having a temperature at which the silicon compound is thermally decomposed, wherein the silicon obtained thereby is condensed in a reactor and discharged from the reactor in liquid form.

In the reactor the pressure is slightly above standard pressure, in particular in the range between 1013.25 mbar and 2000 mbar.

The reactor is preferably a closed reactor, thus a mass transfer can only take place through the outlet for gaseous decomposition products, the outlet for the liquid silicon or the inlet channels for the carrier gas and the silicon compound which are described later.

When the silicon compound used is a silicon-hydrogen compound, decomposition of the silicon compound of course also affords gaseous hydrogen in addition to the liquid silicon already mentioned. Preferably, the hydrogen obtained is not discarded, but instead reused as carrier gas. The hydrogen obtained in the decomposition can correspondingly be returned to the plasma generator, converted to a high-temperature plasma and mixed again with silicon compound.

Even though the silicon compound is alternatively decomposed, i.e. without use of a heated carrier gas, for example by passing the silicon compound through a correspondingly heated hollow body (see above), such a reactor is typically used. It then serves more particularly to condense the silicon and to remove the hydrogen formed, which can be utilized further in an upstream process step for preparing the silicon compound.

The reactor serves, like our process, to prepare high-purity silicon and is suitable especially also for performance thereof. It comprises a heat-resistant interior into which a mixture of the abovementioned silicon compound can be introduced with a carrier gas heated to a temperature as described above. To this end, the reactor has to be lined with appropriate thermally stable materials. Suitable examples here are linings based on graphite. Moreover, it is important that the silicon obtained does not solidify within the reactor. The walls of the reactor interior in operation preferably have a temperature above the melting point of silicon such that no solid silicon deposits can form. The reactor should correspondingly have a suitable insulation to prevent excessive heat losses. Optionally, the reactor may also be provided with one or more heating devices with which the constituents, the walls and/or the interior of the reactor can be heated to temperatures above the melting point of silicon. When a carrier gas is used, however, the reactor is preferably heated exclusively by the carrier gas which has of course already been mentioned.

In addition to the high-temperature-stable interior, the reactor especially also comprises an outlet for gaseous decomposition products (preferably pure hydrogen) and an outlet for the liquid silicon already mentioned. The two will be discussed separately.

Preferably, at least a section of the reactor interior has an essentially cylindrical shape. The mixture of silicon compound and carrier gas can be introduced through a channel which opens into the interior. The opening of this channel is especially arranged in the upper region of the interior, more preferably at the upper end of the essentially cylindrical section, while the outlet for the liquid silicon is preferably in the bottom region of the reactor interior. The bottom of the reactor interior may have a conical shape with the outlet at the lowest point to facilitate the removal of the liquid silicon.

It is also possible to introduce the silicon compound heated according to the mentioned alternative methods (for example by the way of contact with the heated walls of the hollow body and/or as a result of the thermal radiation emanating from the heated walls of the hollow body) through such a channel into the reactor. It is possible that the channel itself forms the hollow body.

Particularly preferably, the channel opens tangentially into the reactor interior, especially at the upper end of the essentially cylindrical section. When the mixture of the silicon compound and the carrier gas is introduced at high flow velocities (as specified above) through such a channel which opens tangentially into the interior, the mixture is rotated significantly owing to the tangential opening of the channel. This results in a rotatory turbulent motion within the reactor, which results in efficient mixing of the plasma, of the silicon compound and of silicon vapors formed.

Within the reactor, the question of the transition of the silicon vapors formed to the liquid phase in particular plays a major role. The rapid condensation of the silicon vapors can be promoted especially by the turbulence addressed, but the temperature of the inner reactor walls at which the silicon condenses primarily is of course an additional important factor. The temperature of the walls of the reactor is preferably kept at a relatively low level (preferably in the range between 1420° C. and 1800° C., in particular between 1500° C. and 1600° C.). To this end, the reactor may have coolants, for example a water jacket, with which the temperature of the inner reactor wall can be regulated.

The outlet for the gaseous decomposition products preferably comprises a filter in the form of a tube open at one side. This is especially arranged in a vertical position in the interior of the reactor, the open side of the tube preferably being in the region of the reactor bottom. Hydrogen formed can enter the tube there and be removed. Any entrained silicon vapors can precipitate on the inside of the tube and move in the direction of the reactor bottom (countercurrent principle). In the tube, there is thus a further removal of entrained silicon vapors from the hydrogen. The tube is preferably kept at a temperature between 1600° C. and 1800° C.

The plant for preparing high-purity silicon comprises primarily a reactor for preparing high-purity silicon as described above. In addition, the plant especially also has a heating apparatus in which the carrier gas can be heated to the abovementioned temperatures. The heating apparatus, as already mentioned, is more preferably a plasma generator.

Further features are evident from the description of a preferred example of our plant for preparing ultrapure silicon which follows. In this context, individual features, in each case alone or several in combination with one another, can be implemented in one example. The preferred examples described serve merely for illustration and for better understanding, and should in no way be interpreted as restrictive.

Turning now to FIG. 1, such a plant 100 can be divided roughly into the reactor 101 and the heating apparatus 102. The latter is especially a plasma generator. In the plasma generator, hydrogen is heated to a temperature between 2000° C. and 3000° C. Subsequently, the monosilane to be decomposed is added to the plasma formed. The mixture formed is injected at high flow velocities through a channel which opens tangentially into the interior 103, which has a cylindrical configuration over wide areas, of the reactor 101. Within the interior, a tubular filter 104 is arranged centrally in a vertical position. The injected mixture can flow around this filter along the inner walls of the reactor 101, where liquid silicon precipitates. The carrier gas and hydrogen gas formed can subsequently enter the filter 104, in which further liquid silicon can be precipitated. This can collect in the lower region of the reactor interior 103. The flow direction of the mixture or of the carrier gas and of the hydrogen gas is indicated schematically by arrows.

In the bottom region, the interior of the reactor 101 has a conical shape. At its lowest point is the outlet 105 for liquid silicon formed.

The invention claimed is:

1. A process of preparing high-purity silicon by thermal decomposition of a silicon compound comprising decomposing the silicon compound by mixing with a carrier gas at a temperature at which the silicon compound is thermally decomposed, wherein energy required for decomposition of the silicon compound is exclusively provided via the carrier gas.

2. A process of preparing high-purity silicon by thermal decomposition of a silicon compound comprising decomposing the silicon compound by mixing with a carrier gas at a temperature at which the silicon compound is thermally decomposed, wherein the carrier gas, before being mixed with the silicon compound, is heated in a plasma generator.

3. A process of preparing high-purity silicon by thermal decomposition of a silicon compound comprising:
   (a) decomposing the silicon compound by mixing with a carrier gas at a temperature at which the silicon compound is thermally decomposed, wherein a mixture comprising the silicon compound, the carrier gas, silicon vapor and gaseous decomposition products is obtained, and
   (b) passing the mixture into a reactor, where the silicon vapor is condensed.

4. The process according to claim 3, wherein the mixture is introduced into the reactor at a flow rate of 200 m/sec to 400 m/sec.

* * * * *